United States Patent Office 3,549,573
Patented Dec. 22, 1970

3,549,573
POLYAMIDES DERIVED FROM OXYPOLYOLE-FINS AND POLYMERIZED FATTY ACIDS
Tibor Gabris, Lausanne, Switzerland, assignor to Liaison, S.A., Geneva, Switzerland
No Drawing. Continuation-in-part of application Ser. No. 577,198, Sept. 6, 1966. This application Nov. 21, 1969, Ser. No. 878,949
Int. Cl. C08g 20/00, 20/26
U.S. Cl. 260—23           6 Claims

ABSTRACT OF THE DISCLOSURE

Oxidized polyolefins containing carboxyl groups are converted to polyamides by condensation reactions with polyamines. For example, an oxidized polyethylene containing carboxyl groups is condensed with a diamine such as ethylenediamine to produce a polyamide. Polymerized fatty acids are preferably present in the polymerization mixture, and other materials can also be used, such as monomeric acids, sulfur, sulfur compounds, among other compounds.

---

This invention relates to the preparation of polymeric materials. Further, this invention relates to copolymer compositions and to methods for the production thereof. More particularly, this invention relates to the preparation of polymeric materials from oxidized polyolefins.

This application is a continuation-in-part of Ser. No. 577,198, filed on Sept. 6, 1966, now abandoned.

Saturated polyolefins such as polyethylene and polypropylene are quite stable to oxidation. It has been observed, however, that under certain conditions, oxidation of these polymers takes place. Recently, very detailed studies have been made to establish the exact mechanism of this type of oxidation (F. H. Winslow, M. Y. Hellman, W. Matreyek, and R. Salovey of Bell Telephone Laboratories of Murray Hill, N.J.; R. H. Hansen, P. M. Rentrepis, T. De Benedicts and J. V. Pascale of the same laboratory. Papers presented at the April 1964 Philadelphia meeting and September 1964 Chicago meeting of the American Chemical Society—Division of Polymer Chemistry), with the conclusion that the oxidation polymer, molecular weight, temperature, specimen thickness or relative surface area, the oxidizing media (air, ozone, atomic oxygen, peroxides, etc.) have an important influence on the oxidation. For example, highly branched saturated hydrocarbon polymers such as polypropylene are not readily attacked by molecular oxygen or by ozone between 40 and 70° C. but their rate of oxidation by atomic oxygen was found to be considerably higher than that of relatively unbranched polyolefins like polyethylene.

The oxidation of polyolefins, which for most industrial applications is to be prevented, can be turned to advantage for the large scale production of oxidation products, especially oxpolyethylenes. Some such oxidation processes start with a very high molecular weight polyethylene, a type which cannot be extruded and through drastic chain scission, yield the oxidized polyethylene; others use a regular grade polyethylene and yield under milder conditions a lower molecular weight end product. All these oxidized polyethylenes, in addition to some scattered carbonyl and hydroxyl groups, contain relatively large percentages of carboxyl groups in their molecules, and heretofore few uses have been found for them.

It is known that polyamide resins can be prepared from simple diamines and/or homologues thereof (e.g. ethylene diamine, 1,4-butylene diamine, methylene dianiline, 2,6-diaminopyridine, benzidine, etc.) and addition polymers of polyene fatty acids or esters of these acids. By "simple" diamine is meant the lower molecular weight and non-polymeric amines as distinguished from the large polymeric molecules, and one particularly common such polyamide is formed employing unsaturated fatty acids or fatty acid esters polymerized mainly to the dimer (i.e. to dicarboxylic acids and esters), there frequently being present also a proportion of trimer or higher oligomer and some residual monomer. Examples of such formulations of polyamides are described in U.S. Pat. Nos. 2,379,413, 2,450,940 and 2,555,111. It has been now found that advantage can be taken of the carboxyl-functionality of oxidized polyolefins for copolymerization with polyamines, or with polyamide-forming compositions such as those referred to above to produce useful copolymerization condensation products, and accordingly the present invention provides a method of forming a copolymer comprising copolymerizing a polyamine and an oxidized polyolefin, with or without a polymerized fatty acid and/or ester. The invention also provides a copolymer of one or more polyamines and one or more oxidized polyolefins, with or without one or more polymerized fatty acids and/or esters.

The oxidized polyolefin/polyamide copolymers according to the invention have many of the inherent properties of both polyamides and polyolefins and therefore have potential applications in the manufacture of hot melt adhesives, hot melt coatings and sealing compounds, epoxy resin cures, paint vehicles, molding compounds, viscosity regulators, and in improving the adhesion of printing inks to difficult surfaces like polyolefin foils. Depending on the percentage of polymerized fatty acid or oxypolyolefin used for copolymerization, the properties of the finished condensation products resemble more a conventional polyamide resin or polyolefin. The oxidized polyolefin/polyamide copolymers may be waxy materials, some of which are useful as plasticizer, e.g. for high M.P. and/or brittle polyamides.

The relative proportions of comonomers employed may for example range from 15 to 50 parts by weight of oxidized polyolefin with 5 to 20 parts by weight of polyamide, per 100 parts of polymerized acid or ester. A straight chain dicarboxylic acid or acids, such as azelaic acid, may be included in the reaction mixture, e.g. in an amount of about 5 to 20 parts by weight per 100 parts by weight of polymerized fatty acids or esters.

A suitable acid component for use in the copolymerization is that obtained from the polymerization of naturally occurring unsaturated carboxylic acids, the component containing about 75 wt. percent dimer, 22 wt. percent trimer, and 3 wt. percent residual monomer. As polyamine component, ethylene diamine or its homologues may be employed, as may other diprimary or monoprimary monosecondary amines.

The reaction mixture may contain a chain stopper; example of chain stoppers are monofunctional organic compounds such as monocarboxylic acids (e.g. oleic, linoleic, or linolenic acid), or monoprimary or monosecondary amines (e.g. aniline). An antioxidant, such as a hindered phenol stabilizer, can also be employed.

The copolymerization can be conducted in the presence of sulphur or an organic sulphur compound so as to yield a copolymer containing chemically combined sulphur. Amongst suitable sulphur compounds are those containing divalent sulphur such as thio-acids (e.g. thiomalic, thiodipropionic, thioglycolic or thiodibenzoic acid) or thioalcohols (e.g. thiodiethanol). A number of suitable reaction mixtures for producing sulphur-modified polyamides are described and claimed in application U.S. Ser. No. 577,187, filed on Sept. 6, 1966, now U.S. Letters Patent 3,445,408, and reference is directed thereto for further details. For example, 1,100 parts of polymerized fatty acids mixed with 26 parts of thioglycolic acid are mixed under nitrogen while stirring with 122.6 parts of 98% ethylene diamine added dropwise. Upon completion of the addition of the diamine, the exothermic reaction mixture was then heated to 140° C. and the temperature was then raised to 250° C., collecting the water condensate. After an amount of condensate close to the theoretical quantity was collected, the reaction was considered to be complete. The sulphur-modified polyamide that resulted had a melting point of about 100° C. and gave much better adhesive to metals than did the product obtained without the use of the thioglycolic acid. Further, the filaments from the sulphur containing polyamide were more elastic than those from the control resin.

It may also be beneficial to include in the reaction mixture an amino-acid, which can be one containing sulphur—e.g. p-aminophenylmercaptoacetic acid.

This invention will be further understood by reference to the discussion and the examples given below all of which are given for illustrative purposes only and are not limitative. The following are presently preferred examples of the method and copolymer according to the invention.

In the examples, reference is made to the commercially available oxidized polyolefins PAD 522 and PAD 521 (manufactured by the Farbwerke Hoechst AG. of Frankfurt, Germany) and HDPE (manufactured by Allied Chemicals Company of the United States of America). These materials were subjected to infra red analysis, the spectra being determined in the solid phase using sodium chloride plates. All three oxidized polyethylenes show strong and typical absorption bands around the 2820 to 2900 cm.$^{-1}$ frequency typical of CH and OH stretching, most probably due to —CH$_2$—CH—OH groupings, and in the 1700 to 1720 cm.$^{-1}$ range typical of carbonyl groups (due to the carboxyl groups present). The infra red spectra also show a strong absorption in the range typical of —CH$_2$— bending.

PAD 522 has an average molecular weight of 2000, a melting point of 95–98° C. and an acid number of 26 to 28. That used in the examples below had a melting point of 99° C. and an acid number of 26. The designation "PAD" stands for "polyaethylene dispersierbar" which translated is "dispersible polyethylene." PAD 521 is also so available and is very similar in its properties to PAD 522 as can be noted from their infra red analyses.

HDPE has a molecular weight in the 8000 range and an acid number of 26. The letters "HDPE" stand for "high density polyethylene." As is known from the trade bulletins and from the cited papers given at the said American Chemical Society meetings the degree of oxidation of these commercially available oxidized polyolefins is measured by their carbonyl content and ranges between about 0.1% to about 2.0%.

EXAMPLE I

In an electrically heated glass resin reaction kettle equipped with a suitable stirrer, a condenser connected to it through a graduated distilling trap, a cover with inlets for a thermometer, an additional funnel and an inlet for introducing nitrogen, 1,128 grams of polymerized fatty acids (from the polymerization of naturally occurring C$_{18}$ unsaturated acids with a dimer content of 75%, trimer content of 22% and monomer content of 3%) were mixed with 212 grams of finely crushed oxidized polyethylene (hereinafter referred to as PAD 522) having a melting point of 99° C. and an acid value of 26. To this mixture, 12.6 grams of hindered phenol type stabilizer were added. The mixture was then deoxygenated with nitrogen and a blanketing stream of nitrogen was thereafter used until the condensation was completed. To melt the wax-like oxidized polyethylene, the temperature was raised to 110° C.; after melting and while stirring, the temperature of the mixture was reduced to 90° C. to avoid any violent reaction in the next step. While stirring, 122.6 grams of 98% ethylene diamine were added dropwise to the mixture. Evolution of heat occurred, due to amine salt formation, bringing the temperature up to 120° C. In one hour, the reaction mixture was gradually heated to 138° C. At this point, the first drops of distillate entered the trap.

The temperature was now raised in 15 minutes to 145° C. resulting in a total distillate of 24 milliliters. In the next 15 minutes, the temperature was increased to 150° C. resulting in a total distillate of 40 milliliters. During the next 45 minutes, the temperature of the reaction mixture was raised to 190° C. which yielded a total distillate of 66 milliliters.

At the final temperature of 250° C., the total quantity of distillate in the trap amounted to 70 milliliters, which was approximately the theoretical amount of water expected in this condensation reaction. As an additional 15 minutes at 250° C. yielded no more distillate, the amber colored reaction product was poured into containers and the physical properties of the finished resin were determined. The characteristics of this resin were as follows:

| | |
|---|---|
| Melting point, ° C. | 100 |
| Acid number | 9.6 |
| Amine number | 3.2 |
| Nitrogen by Kjeldahl, percent | 4.5 |
| Viscosity at 150° C., poise | 370 |
| Viscosity at 150° C., poise after 28 hours in 200° C. oven | 700 |

Solubility at 10% concentration:
| | |
|---|---|
| In cold chloroform | Soluble |
| In cold 50%50 mixture of toluol with isopropyl alcohol | Soluble |
| In hot isopropyl alcohol | Insoluble |
| In hot dimethyl formamide | Insoluble |

The infra red spectrum of the resin, in addition to the aforementioned absorption bands characteristic for the oxidized polyethylene, also shows strong absorption in the 3200 to 3250 cm.$^{-1}$ wavenumber range and in the 1620 to 1640 cm.$^{-1}$ range, the former indicating —NH— groups and the latter being the amide-II range, thus confirming the conversion of the reactants into the corresponding polyamide.

The polymerized acid component referred to in subsequent examples is the same as that described in Example I above.

EXAMPLE II

In this example the melting point of the resin was adjusted by the incorporation of azelaic acid to considerably higher than that of the previously described polyamide. Operations were practically identical with those of Example I. Amount of materials used in the reaction and amounts of distillate collected at the various temperatures are shown in the following schedule:

| | Grams |
|---|---|
| Polymerized fatty acids | 734.5 |
| PAD 522 | 212 |
| Hintered phenolic stabilizer | 12.6 |
| Azelaic acid | 128.5 |
| Ethylene diamine (98%) | 122.6 |

| Heating period after reaction mixture has reached 130° C. | Distillate (water) total amount, milliliters |
|---|---|
| 15 minutes | 2 |
| 60 (166° C.) | 52 |
| 70 (190° C.) | 64 |
| 120 (250° C.) | 70 |

The properties of this resin were as follows:

| | |
|---|---|
| Melting point, ° C. | 176 |
| Melting point after 24 hours at 200° C. | 190 |
| Acid number | 10 |
| Amine number | 4 |
| Nitrogen by Kjeldahl, percent | 4.5 |
| Viscosity at 200° C. poise | 80 |

EXAMPLE III

In this example a resin similar to that of Example I was made with twice the amount of oxidized polyethylene. Operations were practically identical with those of the previous two examples. Amounts of materials used were:

| | Grams |
|---|---|
| Polymerized fatty acids | 1,128 |
| PAD 522 | 420 |
| Hindered phenolic stabilizer | 12.6 |
| Ethylene diamine (98%) | 122.6 |

Distillate collected at the various temperatures was as follows:

| Heating period after reaction mixture has reached 130° C. | Distillate (water) total amount, milliliters |
|---|---|
| 30 minutes (135° C.) | 3 |
| 60 (156° C.) | 40 |
| 105 (200° C.) | 60 |
| 120 (250° C.) | 70 |

The properties of this resin were as follows:

| | |
|---|---|
| Melting point, ° C. | 116 |
| Melting point after 24 hours at 200° C. | 129 |
| Acid number | 1 |
| Amine number | 11.3 |
| Nitrogen by Kjeldahl, percent | 4.2 |
| Viscosity at 200° C., poise | 120 |
| Viscosity at 200° C. after 24 hours in 200° C. oven, poise | 280 |

EXAMPLE IV

In this experiment, a high molecular weight and high melting point oxidized polyethylene with an acid number of 26 and melting point of 135° C. (hereinafter referred to as HDPE) was used in an attempt to make a resin similar to the one described in Example II. Amounts of materials used and amounts of distillate collected at the various temperatures are shown in the following schedule:

| | Grams |
|---|---|
| Polymerized fatty acids | 734.5 |
| HDPE | 420 |
| Azelaic acid | 128.5 |
| Hindered phenolic stabilizer | 12.6 |
| Ethylene diamine (98%) | 122.6 |

| Heating period after reaction mixture has reached 120° C. | Distillate (water) total amount, milliliter |
|---|---|
| 15 minutes (129° C.) | First drop |
| 60 (140° C.) | 26 |
| 90 (165° C.) | 56 |
| 120 (200° C.) | 66 |
| 180 (242° C.) | 70 |

The properties of this resin were as follows:

| | |
|---|---|
| Melting point, ° C. | 180 |
| Acid number | 7.4 |
| Amine number | 2.4 |
| Viscosity at 200° C., poise | 240 |

EXAMPLE V

The following example represents the use of diethylene triamine. Reaction conditions and equipment were identical with those of Example I; the finishing temperature was 200° C. at which point 30 grams of distillate were collected from the reaction mixture which consisted of:

| | Grams |
|---|---|
| Polymerized fatty acids | 500 |
| Oleic acid | 17 |
| PAD 522 | 250 |
| Diethylene triamine | 75 |

The finished resin was a light brown tacky product with an acid number of 2.8 and amine number of 23. This resin could be used as a plasticizer for the higher melting similar resins and due to the free amino groups could be applied as a heat reactive product.

EXAMPLE VI

A flexible and elastic resin with thread forming properties was obtained by the reaction of following materials:

| | Grams |
|---|---|
| Polymerized fatty acids | 1830 |
| PAD 522 | 530 |
| Azelaic acid | 321 |
| Hexane diamine | 582 |

The reaction was completed in the usual manner at 240° C. yielding a distillate of 130 grams of water. The finished resin had a very light yellow color, a melting point of 126° C., acid number of 4.2, amine number of 5.0 and a viscosity of 24 poises at 200° C.

EXAMPLE VII

In the following experiments oxidized polyethylene was reacted with diethylene triamine without the use of polymerized fatty acids. Equipment and reaction conditions were as described in previous examples; reactions were completed at 250° C. The reaction products were light brown colored wax type materials which could be used as plasticizers for the higher melting and/or brittle polyamide resins. Characteristics of the finished reaction products and amounts used for the preparation are shown below:

| | A | B |
|---|---|---|
| PAD 521, grams | 1,000 | 500 |
| Diethylene triamine, grams | 20 | 20 |
| Distillate removed during reaction, grams | 6 | 10 |
| Melting point, ° C | 96 | 96 |
| Acid number | 4.6 | 3.2 |
| Amine number | 4.3 | 31 |
| Viscosity at 200° C., poise | 14 | 2 |

EXAMPLE VIII

The same equipment and conditions were employed as in Example I, the reaction being completed at 240° C. Sixty-six (66) grams of distillate were collected from the following reaction mixture:

| | Grams |
|---|---|
| Polymerized fatty acids | 958 |
| Thiodipropionic acid | 30 |
| HDPE | 420 |
| Ethylene diamine | 122.6 |

The finished resin had a melting point of 110° C. and a viscosity of 450 poises at 150° C. and 56 poises measured at 200° C.

Similar results are obtained when other organic compounds containing divalent sulfur are used instead of thiodipropionic acid. These include thio-acids and thio-alcohols such as thiomalic, thioglycolic and thiodibenzoic acid and thiodiethanol.

From the above examples, it can be seen that in Examples I and II 212 parts by weight of the polyolefin is used, 250 parts is used in Example V, 420 parts is used in Examples III, IV and VIII, 530 parts is used in Example VI, 500 parts is used in part B of Example VII and 1000 parts is used in part A of Example VII. Thus, about 200 to about 1000 parts by weight of the carboxylated polyolefin may be used in producing the products of this invention. With reference to the simple polyamine, 20 parts thereof are used in Example VII, 75 parts in Example V, 122.6 parts in Examples I through IV and Example VIII, and 582 parts in Example VI. Thus, about 20 to about 600 parts by weight of the polyamine may be used. Polymerized fatty acids are used in the amount of 500 parts by weight in Example V, 734.5 parts in Examples II and IV, 958 parts in Example VIII, 1128 parts in Examples I and III, and 1830 parts in Example VI. Thus, about 500 to about 1800 parts by weight of the polymerized fatty acid material may be used in the reaction mixtures to produce the products of this invention. Further, from the above, it is readily appreciated that a condensation reaction is involved in which water is removed. The reactions are carried out usually at a temperature at the beginning of about 100° C. and effecting the removal of water through the application of heat, the final temperature being about 250° C. The operator will, of course, conduct the operation only for such length of time as is necessary to complete the reaction and to complete the removal of the condensation products and will use such amounts of reactants, for example, stoichiometric amounts, as he desires. It is clear that he can apply vacuum to assist the removal of the condensate, such as water, and it is readily seen that the oxidized polyolefins used contain carboxylic acid groups as well as hydroxyl groups, the carboxyl groups being reactive with the polyamines used to produce the polyamides of this invention.

While the copolymerization has been exemplified above employing oxidized polyethylene, it will be understood that other carboxyl-containing oxidized polyolefins can be used such as oxidized copolymers of ethylene or oxidized polypropylene. Further, there may be used polymerized fatty acids and aliphatic and/or aromatic amines other than those specifically mentioned above, as, for example, those disclosed in the above identified U.S. patents. The amines may be diprimary amines or monoprimary monosecondary amines. The polymerized fatty acids that are preferred are those consisting chiefly of the dimer. The monofunctional organic compounds that act as chain stoppers may be monocarboxylic acids or monoprimary or monosecondary amines.

I claim:

1. As a new composition of matter, a polymeric polyamide being a product of an oxidized polyolefin selected from the group consisting of an oxidized polyethylene polymer containing a substantial percentage of carboxyl groups and an oxidized polypropylene polymer containing a substantial percentage of carboxyl groups with a simple polyamine, said product being formed by a condensation reaction between reactants being in the ratio from about 200 to about 1000 parts by weight of said carboxylated polyolefin and from about 20 to about 600 parts by weight of said polyamine in which reaction heat is first applied to melt said polyolefin and additional heat is then applied to effect said condensation reaction and to remove from the reaction mixture volatile condensation products, namely, water, formed in the formation of said polyamide, the initial temperatures being about 100° C. and the final temperatures being under about 250° C.

2. A product in accordance with claim 1 in which about 500 to about 1800 parts by weight of a polymerized fatty acid material is included in said reaction mixture.

3. A product in accordance with claim 1 in which said polyamine is ethylene diamine.

4. A product in accordance with claim 1 in which said polyamine is hexamethylene diamine.

5. A product in accordance with claim 1 in which said polyolefin is oxidized polyethylene.

6. A product in accordance with claim 2 in which about 5 to about 20 parts by weight of a straight chain dicarboxylic acid is present per 100 parts by weight of said polymerized fatty acid material.

No references cited.

HOSEA E. TAYLOR, Primary Examiner

D. J. BARRACK, Assistant Examiner

U.S. Cl. X.R.

260—18, 45.95, 78